(12) United States Patent
Kato

(10) Patent No.: US 11,408,615 B2
(45) Date of Patent: Aug. 9, 2022

(54) REFRIGERATION CYCLE DEVICE

(71) Applicant: DENSO CORPORATION, Kariya (JP)

(72) Inventor: Yoshiki Kato, Kariya (JP)

(73) Assignee: DENSO CORPORATION, Kariya (JP)

( * ) Notice: Subject to any disclaimer, the term of this patent is extended or adjusted under 35 U.S.C. 154(b) by 119 days.

(21) Appl. No.: 16/749,745

(22) Filed: Jan. 22, 2020

(65) Prior Publication Data

US 2020/0166248 A1 May 28, 2020

Related U.S. Application Data

(63) Continuation of application No. PCT/JP2018/025545, filed on Jul. 5, 2018.

(30) Foreign Application Priority Data

Jul. 31, 2017 (JP) .............................. JP2017-148190

(51) Int. Cl.
*B60H 1/32* (2006.01)
*F24D 17/00* (2022.01)
(Continued)

(52) U.S. Cl.
CPC ..... *F24D 17/0005* (2013.01); *B60H 1/00921* (2013.01); *B60H 1/32284* (2019.05); *F25B 27/02* (2013.01); *F25B 29/003* (2013.01); *F25B 41/20* (2021.01); *F25B 41/24* (2021.01); *B60H 2001/00949* (2013.01);
(Continued)

(58) Field of Classification Search
CPC .. F25B 27/02; F25B 29/003; F25B 2339/047; F25B 2600/0261; F25B 2700/2117
See application file for complete search history.

(56) References Cited

U.S. PATENT DOCUMENTS 5,526,650 A 6/1996 Iritani et al.
2012/0255319 A1 10/2012 Itoh et al.
(Continued)

FOREIGN PATENT DOCUMENTS

JP S58052946 A 3/1983
JP 2000203249 A 7/2000
(Continued)

*Primary Examiner* — Jonathan Bradford
(74) *Attorney, Agent, or Firm* — Harness, Dickey & Pierce, P.L.C.

(57) ABSTRACT

A refrigeration cycle device includes a compressor, a heating radiator, a heat medium radiator, a decompressor, an evaporator, and a radiation amount adjuster. The heating radiator is configured to allow a high-pressure refrigerant to release heat to a heat exchange target fluid. The heat medium radiator is configured to allow the high-pressure refrigerant to release heat to a high-temperature side heat medium. The radiation amount adjuster is configured to adjust heat radiation amount radiated from the high-pressure refrigerant to the heat exchange target fluid at the heating radiator. In a heating mode, the radiation amount adjuster is configured to adjust the heat radiation amount at the heating radiator to be larger than a heat radiation amount at the heat medium radiator. In a cooling mode, the radiation amount adjuster is configured to adjust the heat radiation amount at the heating radiator to be lower than that in the heating mode.

8 Claims, 6 Drawing Sheets

(51) Int. Cl.
- *F25B 27/02* (2006.01)
- *F25B 29/00* (2006.01)
- *B60H 1/00* (2006.01)
- *F25B 41/20* (2021.01)
- *F25B 41/24* (2021.01)

(52) U.S. Cl.
CPC . *F25B 2339/047* (2013.01); *F25B 2600/0261* (2013.01); *F25B 2700/2117* (2013.01)

(56) References Cited

U.S. PATENT DOCUMENTS

| | | |
|---|---|---|
| 2013/0019615 A1 | 1/2013 | Choi et al. |
| 2014/0298838 A1* | 10/2014 | Morishita ............ F25D 21/004 62/151 |
| 2014/0345312 A1* | 11/2014 | Katoh ................. F28D 1/0408 62/277 |
| 2015/0159933 A1 | 6/2015 | Itoh et al. |
| 2015/0191072 A1 | 7/2015 | Inoue et al. |

FOREIGN PATENT DOCUMENTS

| | | | |
|---|---|---|---|
| JP | 3331765 B2 | 10/2002 | |
| JP | 2010111269 A | 5/2010 | |
| JP | 2012225637 A | 11/2012 | |
| JP | 2013023210 A | 2/2013 | |
| JP | 2014037959 A | 2/2014 | |
| WO | WO-2013084465 A1 * | 6/2013 | ............... B60L 1/02 |

* cited by examiner

REFRIGERATION CYCLE DEVICE

CROSS REFERENCE TO RELATED APPLICATION

The present application is a continuation application of International Patent Application No. PCT/JP2018/025545 filed on Jul. 5, 2018, which designated the U.S. and claims the benefit of priority from Japanese Patent Application No. 2017-148190 filed on Jul. 31, 2017. The entire disclosures of all of the above applications are incorporated herein by reference.

TECHNICAL FIELD

The present disclosure relates to a freezing cycle device.

BACKGROUND

A refrigeration cycle device capable of switching a refrigerant circuit in accordance with mode selection between a heating mode and a cooling mode is known. In the heating mode, a low-pressure refrigerant is introduced into an exterior heat exchanger to operate the exterior heat exchanger as an evaporator. In the cooling mode, a high-pressure refrigerant is introduced into the exterior heat exchanger to operate the exterior heat exchanger as a radiator.

SUMMARY

A refrigeration cycle device according to an aspect of the present disclosure includes, a compressor, a heating radiator, a heat medium radiator, a decompressor, an evaporator, and a radiation amount adjuster. The compressor is configured to compress a refrigerant and discharge the refrigerant. The heating radiator is configured to allow a high-pressure refrigerant discharged by the compressor to release heat to a heat exchange target fluid. The heat medium radiator is configured to allow the high-pressure refrigerant discharged by the compressor to release heat to a high-temperature side heat medium. The decompressor is configured to decompress the refrigerant on a downstream side of each of the heating radiator and the heat medium radiator. The evaporator is configured to allow the refrigerant decompressed by the decompressor to absorb heat of the heat exchange target fluid such that the refrigerant evaporates. The radiation amount adjuster is configured to adjust a heat radiation amount radiated from the high-pressure refrigerant to the heat exchange target fluid at the heating radiator. In a heating mode for heating the heat exchange target fluid, the radiation amount adjuster is configured to adjust the heat radiation amount at the heating radiator to be larger than a heat radiation amount at the heat medium radiator. In a cooling mode for cooling the heat exchange target fluid, the radiation amount adjuster is configured to adjust the heat radiation amount at the heating radiator to be lower than that in the heating mode.

EMBODIMENTS

A configuration which changes the function of one heat exchanger by switching the refrigerant circuit in accordance with the operation mode (heating mode and cooling mode), and introducing a high-pressure refrigerant or a low-pressure refrigerant into the heat exchanger requires a pressure control valve or a switching valve for the refrigerant circuit. In this case, the refrigerant circuit may become complicated, and complicated control for switching the refrigerant circuit may be needed.

In view of the aforementioned points, it is an object of the present disclosure to simplify a refrigeration cycle device configured to switch between a heating mode for heating heat exchange target fluid and a cooling mode for cooling the heat exchange target fluid.

A plurality of embodiments for practicing the present disclosure will be hereinafter described with reference to the drawings. In the respective embodiments, parts corresponding to matters already described in the preceding embodiments are given reference numbers identical to those of the matters already described. The same description is therefore omitted depending on circumstances. When only a part of a configuration is described in any of the embodiments, the remaining part of this configuration described in other preceding embodiments may be applied to the corresponding embodiment. Not only combinations of parts expressly and specifically described in each of the embodiments as allowable combinations, but also combinations of parts not expressly described in each of the embodiments may be made as long as no particular problems are produced by the respective combinations.

First Embodiment

Figure 1:
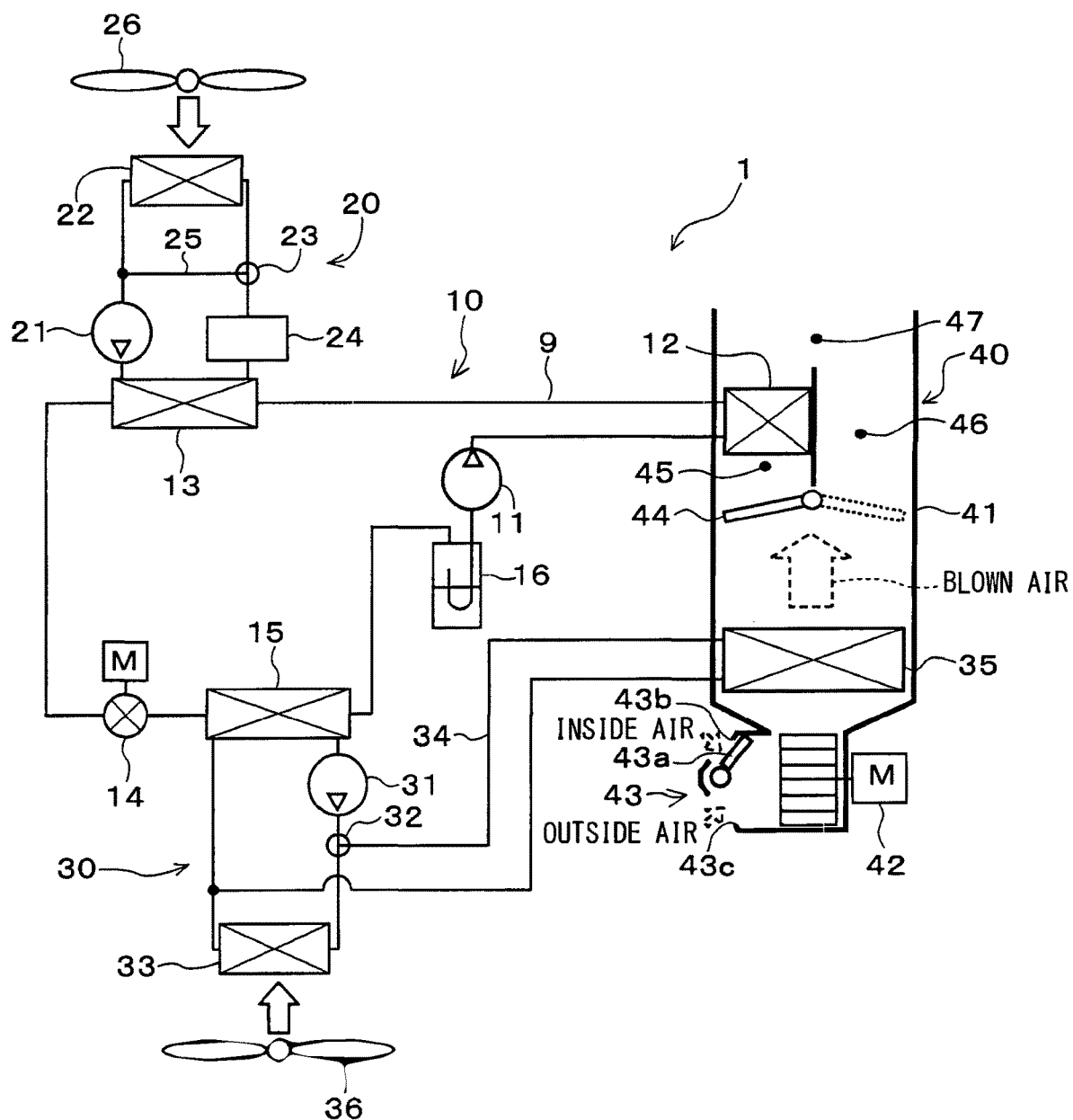
FIG. 1 is an overall configuration diagram of an air conditioner according to at least one of embodiments of the present disclosure.

An air conditioner 1 which includes a refrigeration cycle device 10 according to a first embodiment of the present disclosure will be described with reference to FIGS. 1 and 2. The air conditioner 1 shown in FIG. 1 is applied to a vehicle air conditioner. The vehicle air conditioner is an air conditioner which adjusts a temperature of a vehicle interior space to an appropriate temperature. The air conditioner 1 of the present embodiment is mounted on a hybrid car which obtains driving force for traveling of the vehicle from an engine (i.e., internal combustion engine) and a traveling electric motor.

The hybrid car of the present embodiment is configured as a plug-in hybrid car capable of charging a battery mounted on the vehicle (i.e., in-vehicle battery) with power supplied from an external power supply (i.e., commercial power supply) during a stop of the vehicle. For example, the battery may be constituted by a lithium ion battery.

The driving force output from the engine is used not only for traveling of the vehicle, but also for operating a generator. Power generated by the generator and power supplied from the external power supply can be stored in the battery. The power stored in the battery is supplied not only to the traveling electric motor but also to various in-vehicle devices, such as electric components constituting the refrigeration cycle device 10.

The air conditioner 1 is capable of switching between an operation in a cooling mode for cooling a vehicle interior as an air conditioning target space (i.e., cooling mode for cooling blown air as heat exchange target fluid), and an operation in a heating mode for heating the vehicle interior (i.e., heating mode for heating blown air as heat exchange target fluid). The air conditioner 1 is constituted by the refrigeration cycle device 10, a high-temperature side heat medium flow passage 20, a low-temperature side heat medium flow passage 30, and an interior air conditioning unit 40.

The refrigeration cycle device 10 includes a compressor 11, an interior condenser 12 (heating radiator), an exterior condenser 13 (heat medium radiator), a decompression valve 14 (decompression unit), an evaporator 15, and an accumulator 16 (liquid storage unit) disposed in this order in a refrigerant passage 9. According to the refrigeration cycle device 10 of the present embodiment, a fluorocarbon refrigerant is adopted as the refrigerant to constitute a subcritical refrigeration cycle in which a high-pressure refrigerant pressure does not exceed a critical pressure of the refrigerant.

The compressor 11 is an electric compressor driven by power supplied from the battery, and sucks, compresses and discharges a refrigerant of the refrigeration cycle device 10. Operation of the compressor 11 is controlled in accordance with a control signal output from a controller 50.

The refrigerant inlet side of the interior condenser 12 is connected to a discharge opening of the compressor 11. The interior condenser 12 is disposed inside a casing 41 of the interior air conditioning unit 40 described below. The interior condenser 12 is a heating radiator which exchanges heat between a high-temperature and high-pressure refrigerant (hereinafter abbreviated as high-pressure refrigerant) discharged from the compressor 11 and blown air as heat exchange target fluid, and causes the high-pressure refrigerant to radiate heat to the blown air to heat the blown air at least in the heating mode. When the heat of the high-pressure refrigerant is radiated to the blown air, the high-pressure refrigerant condenses.

The refrigerant inlet side of the exterior condenser 13 is connected to the refrigerant outlet side of the interior condenser 12. The exterior condenser 13 is disposed outside the vehicle interior. The exterior condenser 13 is a heat medium radiator which exchanges heat between the high-pressure refrigerant having flowed from the interior condenser 12 and cooling water as a high-temperature side heat medium circulating in the high-temperature side heat medium flow passage 20, and causes the high-pressure refrigerant to radiate heat to the cooling water at least in the cooling mode.

Each of the cooling water circulating in the high-temperature side heat medium flow passage 20, and the cooling water circulating in the low-temperature side heat medium flow passage 30 described below is a liquid containing at least ethylene glycol, dimethylpolysiloxane, or a nanofluid, or an antifreeze liquid.

The high-temperature side heat medium flow passage 20 is an annular flow passage where cooling water circulates between the exterior condenser 13 and a high-temperature side radiator 22 described below. The exterior condenser 13, a heating device 24, a high-temperature side three-way valve 23, the high-temperature side radiator 22, and a high-temperature side pump 21 are disposed in this order in the high-temperature side heat medium flow passage 20.

The high-temperature side pump 21 sucks cooling water, and discharges the cooling water toward the exterior condenser 13 to circulate the cooling water in the high-temperature side heat medium flow passage 20. The high-temperature side pump 21 is an electric pump, and corresponds to a high-temperature side flow rate control unit which controls a flow rate of the cooling water circulating in the high-temperature side heat medium flow passage 20.

The high-temperature side radiator 22 exchanges heat between the cooling water and outside air supplied from a high-temperature side blower 26. Accordingly, the cooling water heated by the exterior condenser 13 exchanges heat with the outside air to be cooled at the high-temperature side radiator 22.

The high-temperature side blower 26 is an electric blower which drives a fan using an electric motor. Operation of the high-temperature side blower is controlled in accordance with a control signal output from the controller 50. The high-temperature side radiator 22 and the high-temperature side blower 26 are disposed in a front part inside a vehicle hood. Accordingly, an airflow generated during traveling can be applied to the high-temperature side radiator 22 while the vehicle is traveling.

The high-temperature side heat medium flow passage 20 includes a high-temperature side bypass flow passage 25 where the cooling water discharged by the high-temperature side pump 21 circulates while bypassing the high-temperature side radiator 22. The inlet side of the high-temperature side bypass flow passage 25 is connected to the flow inlet side of the high-temperature side radiator 22. The outlet side of the high-temperature side bypass flow passage 25 is connected to the flow outlet side of the high-temperature side radiator 22. The high-temperature side three-way valve 23 is a high-temperature side control valve which controls a flow rate of the cooling water flowing into the high-temperature side radiator 22 by controlling a flow rate of the cooling water flowing into the high-temperature side bypass flow passage 25. Operation of the high-temperature side three-way valve 23 is controlled in accordance with a control signal output from the controller 50.

The heating device 24 supplies heat to the cooling water in the high-temperature side heat medium flow passage 20. The heating device 24 may be constituted by an in-vehicle device which generates heat during operation, or a positive temperature coefficient (PTC) heater (electrical heater) which generates heat by receiving power, for example. More specifically, the in-vehicle device may be constituted by a battery, an inverter as a frequency conversion unit, and a traveling electric motor which outputs driving force for traveling. These in-vehicle devices are cooled by radiation of heat to the cooling water in the high-temperature side heat medium flow passage 20.

The refrigerant inlet side of the decompression valve 14 is connected to the refrigerant outlet side of the exterior condenser 13. The decompression valve 14 is a decompression unit which decompresses and expands a liquid-phase refrigerant having flowed from the exterior condenser 13. Accordingly, the decompression valve 14 decompresses the refrigerant on the downstream side of each of the interior condenser 12 and the exterior condenser 13.

The decompression valve 14 is an electric variable throttle mechanism which operates under control by a control signal output from the controller 50, and includes a valve body and an electric actuator. The valve body is configured to change a passage opening position (i.e., throttle opening position) of the refrigerant passage. The electric actuator has a stepping motor which changes the throttle opening position of the valve body.

The refrigerant inlet side of the evaporator 15 is connected to the refrigerant outlet side of the decompression valve 14. The evaporator 15 is an evaporator which exchanges heat between the low-pressure refrigerant decompressed at the decompression valve 14 and the cooling water as the low-temperature side heat medium circulating in the low-temperature side heat medium flow passage 30 to evaporate the low-pressure refrigerant. At the evaporator 15, the low-pressure refrigerant absorbs heat from the cooling water and evaporates by the heat to cool the cooling water.

The low-temperature side heat medium flow passage 30 is an annular flow passage where cooling water as the low-temperature side heat medium circulates. The evaporator 15, a low-temperature side pump 31, a cooler core passage three-way valve 32, and a low-temperature side radiator 33 are disposed in this order in the low-temperature side heat medium flow passage 30.

The low-temperature side pump 31 is a heat medium pump which sucks and discharges cooling water. The low-temperature side pump 31 is an electric pump, and corresponds to a low-temperature side flow rate control unit which controls a flow rate of the cooling water circulating in the low-temperature side heat medium flow passage 30.

A cooler core flow passage 34 is connected to the low-temperature side heat medium flow passage 30. The cooler core flow passage 34 is a passage where the cooling water as the low-temperature side heat medium discharged by the low-temperature side pump 31 circulates while bypassing the low-temperature side radiator 33. One and the other ends of the cooler core flow passage 34 are connected to the flow inlet side and the flow outlet side of the low-temperature side radiator 33, respectively, in the low-temperature side heat medium flow passage 30.

The cooler core passage three-way valve 32 is a cooler core flow rate control valve which controls a flow rate of the cooling water flowing into the low-temperature side radiator 33 by controlling a flow rate of the cooling water as the low-temperature side heat medium flowing into the cooler core flow passage 34. Operation of the cooler core passage three-way valve 32 is controlled in accordance with a control signal output from the controller 50.

The low-temperature side radiator 33 exchanges heat between the cooling water as the low-temperature side heat medium and the outside air supplied from a low-temperature side blower 36. Accordingly, the cooling water cooled at the evaporator 15 and introduced into the low-temperature side radiator 33 exchanges heat with the outside air, whereby the low-temperature cooling water can absorb heat from the outside air.

The low-temperature side blower 36 supplies the outside air toward the low-temperature side radiator 33. The low-temperature side blower 36 is an electric blower which drives a fan using an electric motor. Operation of the low-temperature side blower 36 is controlled in accordance with a control signal output from the controller 50. The low-temperature side radiator 33 and the low-temperature side blower 36 are disposed in the front part inside the vehicle hood similarly to the high-temperature side radiator 22 and the high-temperature side blower 26. Accordingly, an airflow generated during traveling of the vehicle can be applied to the low-temperature side radiator 33 while the vehicle is traveling.

The cooler core 35 exchanges heat between the cooling water in the low-temperature side heat medium flow passage 30 and blown air as heat exchange target fluid supplied to the vehicle interior. Accordingly, the blown air can be cooled by the cooling water cooled at the evaporator 15 and introduced into the cooler core 35. More specifically, the evaporator 15 according to the present embodiment causes the refrigerant decompressed at the decompression valve 14 to absorb heat of the blown air via the cooling water to evaporate the refrigerant.

The refrigerant inlet side of the accumulator 16 is connected to the refrigerant outlet side of the evaporator 15. More specifically, the accumulator 16 is provided between the evaporator 15 and the compressor 11, i.e., on the upstream side of the compressor 11. The accumulator 16 functions as a gas-liquid separation unit which separates the refrigerant having flowed into the accumulator 16 into gas and liquid, and also as a liquid storage unit where a surplus refrigerant in the cycle is stored.

The suction opening side of the compressor 11 is connected to a gas-phase refrigerant outlet of the accumulator 16. Accordingly, the accumulator 16 has a function of reducing suction of a liquid-phase refrigerant into the compressor 11 to prevent liquid compression of the compressor 11.

Furthermore, according to the refrigeration cycle device 10 of the present embodiment, a required refrigerant flow rate for circulation in the cycle in the cooling mode is higher than a required refrigerant flow rate for circulation in the cycle in the heating mode. Accordingly, a function of storing a surplus liquid-phase refrigerant in the cycle is performed in the heating mode to absorb variations of the required refrigerant flow rate.

The interior air conditioning unit 40 will be next described. The interior air conditioning unit 40 is a unit for supplying blown air temperature-controlled by the refrigeration cycle device 10 to the vehicle interior as an air conditioning target space. The interior air conditioning unit 40 is disposed inside an instrument panel at a foremost part of the vehicle interior. The interior air conditioning unit 40 is constituted by the cooler core 35, the interior condenser 12, and the like housed in a casing 41 which forms an outside case of the interior air conditioning unit 40.

The casing 41 is an air passage forming unit which forms an air passage of blown air supplied to the vehicle interior as the air conditioning target space. The casing 41 is a molded component made of resin having a certain degree of elasticity and excellent strength (e.g., polypropylene). An inside-outside air switching device 43 is disposed on the blown air flow most upstream side within the casing 41. The inside-outside air switching device 43 is an inside-outside air switching unit which switches between introduction of inside air (air within air conditioning target space) and introduction of outside air (air outside air conditioning target space) into the casing 41.

The inside-outside air switching device 43 includes an inside air introduction port 43b through which the inside air is introduced into the casing 41, and an outside air introduction port 43c through which the outside air is introduced into the casing 41. The inside-outside air switching device 43 further includes an inside-outside air switching door 43a capable of swinging. The inside-outside air switching door 43a is driven by an electric actuator which operates under control by a control signal output from the controller 50.

The inside-outside air switching device 43 switches between an outside air mode and an inside air mode using the inside-outside air switching door 43a. The outside air mode is a mode which closes the inside air introduction port 43b and opens the outside air introduction port 43c using the inside-outside air switching door 43a to introduce the outside air present in a space out of the air conditioning target space into the casing 41. The inside air mode is a mode which closes the outside air introduction port 43c and opens the inside air introduction port 43b using the inside-outside air switching door 43a to introduce the inside air present within the air conditioning target space into the casing 41.

The inside-outside air switching device 43 is capable of continuously changing an air volume ratio of an inside air volume to an outside air volume by continuously controlling opening areas of the inside air introduction port 43b and the outside air introduction port 43c using the inside-outside air switching door 43a.

An air-conditioning blower 42 which supplies air sucked via the inside-outside air switching device 43 to the inside of the air conditioning target space is disposed on the blown air flow downstream side of the inside-outside air switching device 43. The air-conditioning blower 42 is an electric blower that drives a centrifugal multi-blade fan (sirocco fan) by using an electric motor. The rotation speed (air supply volume) of the air-conditioning blower 42 is controlled by a control voltage output from the controller 50.

The cooler core 35 is disposed on the blown air flow downstream side of the air-conditioning blower 42 in the air passage formed within the casing 41. The downstream side of the cooler core 35 in the air passage formed in the casing 41 is branched into two passages where an interior condenser passage 45 and a cold air bypass passage 46 are formed in parallel.

The interior condenser 12 is disposed within the interior condenser passage 45. Accordingly, the interior condenser passage 45 is an air passage where the blown air which exchanges heat with the refrigerant at the interior condenser 12 circulates. The cooler core 35 and the interior condenser 12 are disposed in this order with respect to the blown air flow. In other words, the cooler core 35 is disposed on the blown air flow upstream side with respect to the interior condenser 12. The interior condenser passage 45 constitutes a part of an air passage where the blown air passes through the cooler core 35 and the interior condenser 12 in this order.

The cold air bypass passage 46 is an air passage through which the blown air having passed through the cooler core 35 flows downstream side while bypassing the interior condenser 12.

An air mix door 44 is disposed on the blown air flow downstream side of the cooler core 35 and on the blown air flow upstream side of the interior condenser 12. The air mix door controls a volume ratio of blown air passing through the cooler core 35 and subsequently passing through the interior condenser 12 in accordance with a control signal output from the controller 50.

A mix passage 47 is formed within the casing 41 on the downstream side of a junction of the interior condenser passage 45 and the cold air bypass passage 46. The blown air heated at the interior condenser 12 and the blown air passing through the cold air bypass passage 46 and not heated at the interior condenser 12 are mixed within the mix passage 47.

In addition, a plurality of opening holes through which blown air mixed in the mixing space (conditioned air) is blown to the vehicle interior as the air conditioning target space are formed in the blown air flow most downstream portion of the casing 41.

Specifically, these opening holes include a face opening hole, a foot opening hole, and a defroster opening hole (none of these holes shown). The face opening hole is an opening hole through which the conditioned air is blown toward the upper body of an occupant in the vehicle interior as the air conditioning target space. The foot opening hole is an opening hole through which the conditioned air is blown toward the feet of the occupant. The defroster opening hole is an opening hole through which the conditioned air is blown toward the inner side surface of a vehicle front windshield.

The blown air flow downstream sides of the face opening hole, the foot opening hole, and the defroster opening hole are connected to a face blow outlet, a foot blow outlet, and a defroster blow outlet (none of these outlets shown), respectively, provided in the vehicle interior as the air conditioning target space via ducts each forming an air passage.

Accordingly, the temperature of the conditioned air mixed in the mixing space is controlled by controlling the ratio of the air volume passing through the interior condenser 12 to the air volume passing through the cold air bypass passage 46 using the air mix door 44, whereby the temperature of the conditioned air blown from the respective blow outlets to the vehicle interior corresponding to the air conditioning target space is controlled.

That is, the air mix door 44 functions as a temperature control unit for controlling the temperature of the conditioned air supplied to the vehicle interior as the air conditioning target space. The air mix door 44 has an electric actuator for driving the air mix door. Operation of the electric actuator is controlled in accordance with a control signal output from the controller 50.

When the electric actuator for driving the air mix door shifts the air mix door 44 in such a manner as to open the interior condenser passage 45 and close the cold air bypass passage 46, the blown air having passed through the cooler core 35 is supplied to the interior condenser 12. Accordingly, heat of the high-pressure refrigerant can be radiated to the blown air at the interior condenser 12.

On the other hand, when the air mix door 44 is shifted in such a manner as to open the cold air bypass passage 46 and close the interior condenser passage 45, the heat of the high-pressure refrigerant cannot be radiated to the blown air at the interior condenser 12. Accordingly, the air mix door 44 functions as a radiation amount control unit which controls the heat radiation amount from the high-pressure refrigerant to the blown air at the interior condenser 12.

A face door for controlling an opening area of the face opening hole, a foot door for controlling an opening area of the foot opening hole, and a defroster door for controlling an opening area of the defroster opening hole (none of these doors shown) are disposed on the blown air flow upstream side of the face opening hole, the foot opening hole, and the defroster opening hole, respectively.

Each of the face door, the foot door, and the defroster door constitutes a blow outlet mode switching door for switching a blow outlet mode. Each of the face door, the foot door, and the defroster door is connected to an electric actuator for driving the blow outlet mode door via a link mechanism or the like, and is rotationally operated in cooperation with the electric actuator. Operation of this electric actuator is also controlled in accordance with a control signal output from the controller 50.

Specifically, examples of the blow outlet mode switched by the blow outlet mode switching door include a face mode, a bi-level mode, a foot mode, and the like.

The face mode is a blow outlet mode which supplies blown air from the full-opened face blow outlet toward the upper body of the occupant in the vehicle interior. The bi-level mode is a blow outlet mode which supplies blown air from the face blow outlet and the foot blow outlet both opened toward the upper body and the feet of the occupant in the vehicle interior. The foot mode is a blow outlet mode which supplies blown air from the full-opened foot blow outlet toward the feet of the occupant in the vehicle interior.

Figure 2:
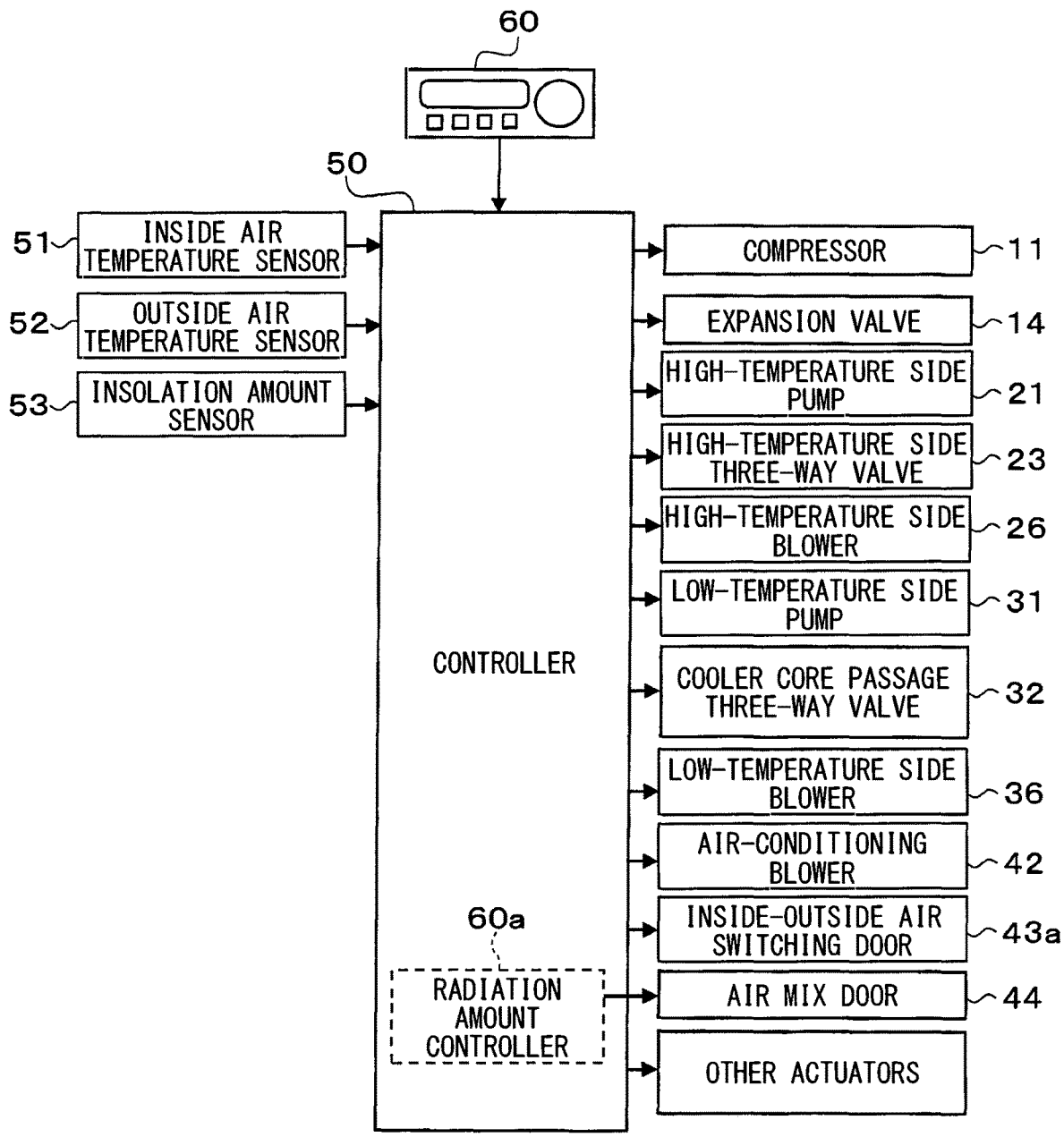
FIG. 2 is a block diagram showing an electric control unit of an air conditioner according to at least one of embodiments of the present disclosure.

Furthermore, the occupant may manually operate a blow outlet mode selector switch provided on an operation unit 60 shown in FIG. 2 to set the defroster mode which supplies blown air from the full-opened defroster blow outlet toward the inner surface of the vehicle front windshield.

An outline of an electric control unit of the air conditioner 1 of the present embodiment will be next described. The controller 50 shown in FIG. 2 is constituted by a known microcomputer including a central processing unit (CPU), a read only memory (ROM), a random access memory (RAM), and the like, and peripheral circuits of the microcomputer. The controller 50 performs various calculations and processes based on a control program stored in the ROM. Various control target devices are connected to the output side of the controller 50. The controller 50 is a control unit which controls operations of the various control target devices.

The control target devices controlled by the controller 50 include the compressor 11, the decompression valve 14, the high-temperature side pump 21, the high-temperature side three-way valve 23, the high-temperature side blower 26, the low-temperature side pump 31, the cooler core passage three-way valve 32, the low-temperature side blower 36, the air-conditioning blower 42, the inside-outside air switching door 43a, the air mix door 44, and the like.

The controller 50 is constituted by controllers integrated into one body to control the various control target devices connected to the output side of the controller 50. Configurations (hardware and software) controlling operations of the respective control target devices in the controller 50 constitute the controllers controlling the operations of the corresponding control target devices. For example, software and hardware controlling the air mix door 44 in the controller 50 constitute a radiation amount controller 60a.

Various control sensors such as an inside air temperature sensor 51, an outside air temperature sensor 52, and an insolation amount sensor 53 are connected to the input side of the controller 50. The inside air temperature sensor 51 detects a vehicle interior temperature Tr. The outside air temperature sensor 52 detects an outside air temperature Tam. The insolation amount sensor 53 detects an insolation amount Ts in the vehicle interior.

The operation unit 60 is connected to the input side of the controller 50. The operation unit 60 is operated by the occupant. The operation unit 60 is disposed in the vicinity of the instrument panel in the front part of the vehicle interior. An operation signal sent from the operation unit 60 is input to the controller 50. The operation unit 60 includes an air conditioner switch, a temperature setting switch, and the like. The air conditioner switch sets whether to cool the blown air in the interior air conditioning unit. The temperature setting switch sets a set temperature of the vehicle interior.

Operation of the above configuration will be next described. The controller 50 calculates a target blow temperature TAO of the blown air supplied to the vehicle interior based on a detection signal detected by the control sensors and an operation signal received from the operation unit 60. Subsequently, the operation mode is switched based on the target blow temperature TAO and the like. Furthermore, according to the present embodiment, the operation mode is switched to an extremely low temperature heating mode at an extremely low temperature time when the outside air temperature is equal to or lower than a predetermined reference outside temperature. Each of the operation mode will be hereinafter described.

(Cooling Mode)

In the cooling mode, the controller 50 determines operation states of the various control target devices (control signals output to various control devices) based on the detection signal, the target blow temperature TAO, and the like. Specifically, the controller 50 operates each of the compressor 11, the high-temperature side pump 21, and the low-temperature side pump 31 such that a predetermined discharge ability in the cooling mode can be exercised. The controller 50 determines a control signal output to the decompression valve 14 such that a predetermined throttle opening position for the cooling mode can be set.

The controller 50 closes the high-temperature side bypass flow passage 25, and controls operation of the high-temperature side three-way valve 23 such that the cooling water flows into the high-temperature side radiator 22. The controller 50 opens the cooler core flow passage 34, and controls the operation of the cooler core passage three-way valve 32 such that the cooling water flows into the cooler core 35.

Furthermore, the controller 50 closes the interior condenser passage 45 (state indicated by solid line in FIG. 1), and controls operation of the air mix door 44 such that the total flow rate of the blown air having passed through the cooler core 35 flows into the cold air bypass passage 46.

According to the refrigeration cycle device 10 in the cooling mode, therefore, the high-pressure refrigerant discharged from the compressor 11 flows into the interior condenser 12. In the cooling mode, the air mix door 44 is shifted to introduce the blown air into the cold air bypass passage 46. Accordingly, the high-pressure refrigerant having flowed into the interior condenser 12 flows from the interior condenser 12 while radiating substantially no heat to the blown air.

The high-pressure refrigerant having flowed from the interior condenser 12 flows into the exterior condenser 13. In the heating mode, the high-temperature side three-way valve 23 is switched to introduce the cooling water into the high-temperature side radiator 22. Accordingly, the high-pressure refrigerant having flowed into the exterior condenser 13 radiates heat to the cooling water cooled at the high-temperature side radiator 22, and condenses by the heat radiation. In this manner, the heat of the high-pressure refrigerant is absorbed by the cooling water at the exterior condenser 13.

Accordingly, in the cooling mode, the heat radiation amount of the high-pressure refrigerant at the interior condenser 12 is smaller than the heat radiation amount of the high-pressure refrigerant at the exterior condenser 13.

The high-pressure refrigerant having flowed from the exterior condenser 13 flows into the decompression valve 14. At this time, the decompression valve 14 is in a throttling state for performing decompression. Accordingly, the refrigerant having flowed into the decompression valve 14 is decompressed to become a low-pressure refrigerant.

The pump 31 is operated. Accordingly, the low-pressure refrigerant having flowed into the evaporator 15 absorbs heat from the cooling water circulating in the low-temperature side heat medium flow passage 30, and evaporates by the absorbed heat. In this manner, the cooling water circulating in the low-temperature side heat medium flow passage 30 is cooled.

Furthermore, in the cooling mode, the cooler core passage three-way valve 32 is switched to introduce the cooling water into the cooler core 35. Accordingly, the cooling water cooled by the evaporator 15 exchanges heat with the blown air at the cooler core 35, and absorbs heat. As a result, the blown air is cooled.

The refrigerant having flowed from the evaporator 15 enters the accumulator 16, and is separated into gas and liquid. Then, the gas-phase refrigerant separated by the accumulator 16 is sucked into the compressor 11 and compressed again.

As described above, in the cooling mode, the blown air cooled at the cooler core 35 can be blown to the vehicle interior. Accordingly, cooling of the vehicle interior is achievable.

(Heating Mode)

In the heating mode, the controller 50 determines operation states of the various control target devices (control signals output to various control devices) based on the detection signal, the target blow temperature TAO and the like. Specifically, the controller 50 operates each of the compressor 11, the high-temperature side pump 21, and the low-temperature side pump 31 such that a predetermined discharge ability in the heating mode can be exercised. The controller 50 determines a control signal output to the decompression valve 14 such that a predetermined throttle opening position for the heating mode can be set.

The controller 50 closes the high-temperature side bypass flow passage 25, and controls operation of the high-temperature side three-way valve 23 such that the cooling water flows into the high-temperature side radiator 22. The controller 50 closes the cooler core flow passage 34, and controls the operation of the cooler core passage three-way valve 32 such that the cooling water flows into the low-temperature side radiator 33.

Furthermore, the controller 50 closes the cold air bypass passage 46 (state indicated by broken line in FIG. 1), and controls operation of the air mix door 44 such that the total flow rate of the blown air having passed through the cooler core 35 flows into the interior condenser passage 45. Accordingly, the flow rate of the blown air flowing into the interior condenser 12 in the heating mode becomes higher than in the cooling mode. In other words, the flow rate of the blown air flowing into the interior condenser 12 in the cooling mode becomes lower than in the heating mode.

According to the refrigeration cycle device 10 in the heating mode, therefore, the high-pressure refrigerant discharged from the compressor 11 flows into the interior condenser 12. In the heating mode, the air mix door 44 is shifted to introduce the blown air to the interior condenser passage 45. In this case, the high-pressure refrigerant having flowed into the interior condenser 12 radiates heat to the blown air, and condenses by the heat radiation. Accordingly, the blown air flowing in the interior condenser passage 45 is heated.

The high-pressure refrigerant having flowed from the interior condenser 12 flows into the exterior condenser 13. In the heating mode, the high-temperature side three-way valve 23 is switched to introduce the cooling water into the high-temperature side radiator 22. Accordingly, the high-pressure refrigerant having flowed into the exterior condenser 13 further radiates heat to the cooling water cooled at the high-temperature side radiator 22, and condenses similarly to the cooling mode. In this manner, the heat of the high-pressure refrigerant is absorbed by the cooling water at the exterior condenser 13.

At this time, in the heating mode, the heat radiation amount of the high-pressure refrigerant at the interior condenser 12 is larger than the heat radiation amount of the high-pressure refrigerant at the exterior condenser 13. Accordingly, the vapor quality of the high-pressure refrigerant on the inlet side of the exterior condenser 13 in the heating mode becomes smaller than in the cooling mode.

Furthermore, the heat radiation amount of the high-pressure refrigerant at the interior condenser 12 in the heating mode becomes larger than in the cooling mode. In other words, the heat radiation amount of the high-pressure refrigerant at the interior condenser 12 in the cooling mode becomes smaller than in the heating mode.

The high-pressure refrigerant having flowed from the exterior condenser 13 is decompressed by the decompression valve 14 to become a low-pressure refrigerant similarly to the cooling mode.

The low-pressure refrigerant decompressed at the decompression valve 14 flows into the evaporator 15. In the heating mode, the low-temperature side pump 31 is operated. Accordingly, the low-pressure refrigerant having flowed into the evaporator 15 absorbs heat from the cooling water circulating in the low-temperature side heat medium flow passage 30, and evaporates by the absorbed heat. In this manner, the cooling water circulating in the low-temperature side heat medium flow passage 30 is cooled.

Furthermore, in the heating mode, the cooler core passage three-way valve 32 is switched to introduce the cooling water into the low-temperature side radiator 33. Accordingly, the cooling water cooled at the evaporator 15 exchanges heat with the outside air at the low-temperature side radiator 33, and is heated through the heat exchange. The refrigerant having flowed from the evaporator 15 enters the accumulator 16, and is separated into gas and liquid. Then, the gas-phase refrigerant separated by the accumulator 16 is sucked into the compressor 11 and compressed again.

As described above, in the heating mode, the blown air heated at the interior condenser 12 can be blown to the vehicle interior. In this manner, heating of the vehicle interior is achievable. Furthermore, the refrigerant can be condensed by the exterior condenser 13, and the condensed refrigerant can be retained in the exterior condenser 13.

(Extremely Low Temperature Heating Mode)

In the extremely low temperature heating mode, the controller 50 determines the operation states of the various control target devices (control signals output to various control devices) similarly to the heating mode. In the extremely low temperature heating mode, the controller 50 opens the high-temperature side bypass flow passage 25, and controls operation of the high-temperature side three-way valve 23 such that the cooling water flows while bypassing the high-temperature side radiator 22.

According to the refrigeration cycle device 10, therefore, the high-pressure refrigerant discharged from the compressor 11 flows into the interior condenser 12. In the heating mode, the air mix door 44 is shifted to introduce the blown air to the interior condenser passage 45. In this case, the high-pressure refrigerant having flowed into the interior condenser 12 radiates heat to the blown air, and condenses by the heat radiation. Accordingly, the blown air flowing in the interior condenser passage 45 is heated. At the time of an extremely low temperature, the temperature of the blown air flowing into the interior condenser 12 is low. Accordingly, the high-pressure refrigerant having flowed into the interior condenser 12 becomes a liquid-phase refrigerant having a degree of subcooling.

The high-pressure refrigerant having flowed from the interior condenser 12 flows into the exterior condenser 13. In the extremely low temperature heating mode, the high-temperature side three-way valve 23 is switched to introduce the cooling water into the high-temperature side bypass flow passage 25. Accordingly, the high-pressure refrigerant having flowed into the exterior condenser 13 is heated by the cooling water heated by the heating device 24. Subsequent operations are similar to the corresponding operations in the heating mode.

As described above, the blown air heated at the interior condenser 12 can be blown to the vehicle interior in the extremely low temperature heating mode. In this manner, heating of the vehicle interior is achievable. Furthermore, the high-pressure side refrigerant pressure in the cycle can be raised by heating the refrigerant at the exterior condenser 13. Accordingly, the temperature of the blown air can be efficiently raised by raising the refrigerant condensation temperature at the interior condenser 12.

As described above, in the heating mode, the air mix door 44 as the radiation control unit operates such that the heat radiation amount at the interior condenser 12 becomes larger than the heat radiation amount at the exterior condenser 13. On the other hand, the air mix door 44 operates such that the heat radiation amount at the interior condenser 12 in the cooling mode becomes smaller than in the heating mode.

In this manner, the heat radiation amount from the high-pressure refrigerant to the blown air at the interior condenser 12 is controlled by the air mix door 44. Accordingly, switching between the heating mode and the cooling mode is achievable without the need of switching the refrigerant circuit of the refrigeration cycle device 10.

More specifically, the heating mode can be achieved by increasing the heat radiation amount at the interior condenser 12, and heating the blown air at the interior condenser 12. The cooling mode can be achieved by reducing the heat radiation amount at the interior condenser 12, and cooling the blown air through heat absorption by the refrigerant at the evaporator 15.

Accordingly, the necessity of a pressure control valve and a selector valve for switching the refrigerant circuit in accordance with the operation mode is eliminated. As a result, the cycle configuration of the refrigeration cycle device 10 can be simplified, and complicated control for switching the refrigerant circuit of the cycle device 10 is not needed.

Moreover, the air mix door 44 operates such that the vapor quality of the refrigerant on the inlet side of the exterior condenser 13 becomes smaller in the heating mode than in the cooling mode. Accordingly, the liquid-phase refrigerant can be retained at the exterior condenser 13 in the heating mode.

Figure 3:
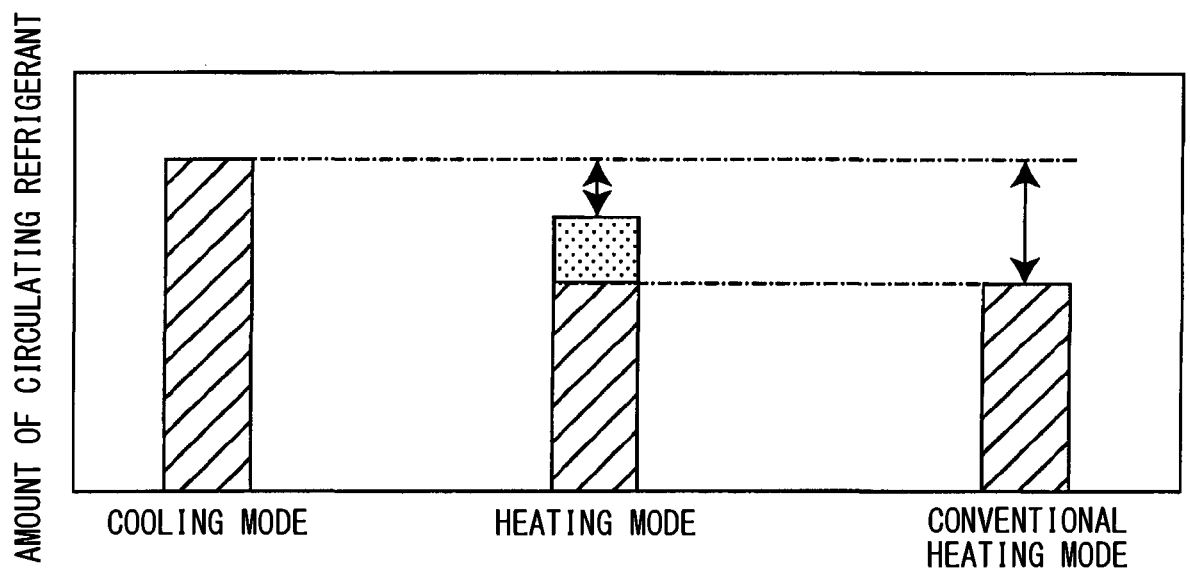
FIG. 3 is a graph showing an amount of a refrigerant circulating in a refrigeration cycle device.

According to the refrigeration cycle device 10 of the present embodiment, a required refrigerant flow rate for circulation in the cycle in the cooling mode is higher than a required refrigerant flow rate for circulation in the cycle in the heating mode as shown in FIG. 3. On the other hand, in the heating mode of the present embodiment, the condensed refrigerant can be retained at the exterior condenser 13 as described above.

Accordingly, as shown in FIG. 3, the refrigeration cycle device 10 of the present embodiment can reduce a required minimum capacity of the accumulator 16 in comparison with a conventional refrigeration cycle device, and therefore can reduce the size of the accumulator 16 by reduction of the capacity of the accumulator 16.

Furthermore, the accumulator 16 can be eliminated by controlling the heat radiation amounts at the interior condenser 12 and the exterior condenser 13 such that all variations of the amount of the refrigerant circulating within the refrigeration cycle device 10 can be absorbed at the exterior condenser 13 by increasing the amount of the refrigerant retained at the exterior condenser 13. In this manner, further reduction of the size of the refrigeration cycle device 10, and reduction of manufacturing costs of the refrigeration cycle device 10 are achievable.

While the accumulator 16 can be eliminated as described above, the accumulator 16 provided in the refrigeration cycle device 10 as in the present embodiment can further securely absorb variations of the required refrigerant flow rate circulating within the refrigeration cycle device 10 at the time of switching of the operation mode.

According to the refrigeration cycle device 10 of the present embodiment, the air mix door 44 controls the flow rate of the blown air passing through the interior condenser 12. The air mix door 44 operates such that the flow rate of the blown air passing through the interior condenser 12 becomes smaller in the cooling mode than in the heating mode. In this manner, such a radiation amount control unit which controls the heat radiation amount from the high-pressure refrigerant to the blown air at the interior condenser 12 can be easily produced.

According to the refrigeration cycle device 10 of the present embodiment, the heating device 24 heats the high-pressure refrigerant having flowed from the interior condenser 12 in the extremely low temperature heating mode. In this manner, the high pressure-side refrigerant pressure of the refrigeration cycle device 10 can be raised. Accordingly, the temperature of the blown air can be efficiently raised by raising the refrigerant condensation temperature at the interior condenser 12, wherefore the heating performance of the air conditioner 1 improves.

Moreover, the heating device 24 disposed in the high-temperature side heat medium flow passage 20 heats the high-pressure refrigerant by heating the cooling water. Accordingly, the high-pressure refrigerant can be heated by a simple configuration in the extremely low temperature heating mode. When the heating device 24 is an in-vehicle device, the high-pressure refrigerant can be heated by exhaust heat of the in-vehicle device. Accordingly, the necessity of supplying energy for heating the high-pressure refrigerant is eliminated.

The high-temperature side heat medium flow passage 20 of the present embodiment includes the high-temperature side radiator 22, the high-temperature side bypass flow passage 25, and the high-temperature side three-way valve 23. In this case, a heating quantity of the cooling water can be easily controlled even when a heating ability is difficult to control as in a case where the heating device 24 is constituted by an in-vehicle device.

The refrigeration cycle device 10 according to the present embodiment includes the low-temperature side radiator 33 which cools the cooling water by heat exchange between the cooling water and the outside air, the low-temperature side heat medium flow passage 30 where the cooling water circulates between the evaporator 15 and the low-temperature side radiator 33, and the low-temperature side pump 31 which discharges the cooling water and circulates the cooling water in the low-temperature side heat medium flow passage 30.

Accordingly, the cooling water circulating in the low-temperature side heat medium flow passage 30 is heated by heat exchange with the outside air at the low-temperature side radiator 33. The heat of the heated cooling water is absorbed by the low-pressure refrigerant at the evaporator 15.

The low-temperature side heat medium flow passage 30 of the present embodiment includes the cooler core flow passage 34. One and the other ends of the cooler core flow passage 34 are connected to the flow inlet side and the flow outlet side of the low-temperature side radiator 33, respectively, in the low-temperature side heat medium flow passage 30. The cooling water discharged by the low-temperature side pump 31 circulates in the cooler core flow passage 34 while bypassing the low-temperature side radiator 33. The cooler core flow passage 34 includes the cooler core 35 which achieves heat exchange between the cooling water and the blown air to cause the cooling water to absorb heat of the blown air.

The low-temperature side heat medium flow passage 30 further includes the cooler core passage three-way valve 32 which controls the flow rate of the cooling water flowing into the cooler core flow passage 34, and the flow rate of the cooling water flowing into the low-temperature side radiator 33.

In the cooling mode, the cooler core passage three-way valve 32 opens the cooler core flow passage 34, and closes the flow passage on the flow inlet side of the low-temperature side radiator 33 of the low-temperature side heat medium flow passage 30. Accordingly, the cooling water is allowed to circulate in the cooler core 35, and cool the blown air circulating in the casing 41 at the cooler core 35.

In the heating mode, the cooler core passage three-way valve 32 closes the cooler core flow passage 34, and opens the low-temperature side heat medium flow passage 30 on the flow inlet side of the low-temperature side radiator 33. In this case, the cooling water does not flow in the cooler core 35, wherefore the blown air flows into the interior condenser 12 without being cooled at the cooler core 35. Accordingly, in the heating mode, useless cooling of the blown air by the cooler core 35 is avoidable, wherefore the heating ability of the air conditioner 1 improves.

According to the refrigeration cycle device 10 of the present embodiment, the interior condenser 12 exchanges heat between the high-pressure refrigerant and the blown air to heat the blown air in the heating mode. In this case, heat of the high-pressure refrigerant can be radiated directly to the blown air. Accordingly, the heating ability of the blown air of the refrigeration cycle device 10 improves in comparison with a case where the heat of the high-pressure refrigerant is indirectly radiated to the blown air via a heat medium or the like, for example.

Second Embodiment

Figure 4:
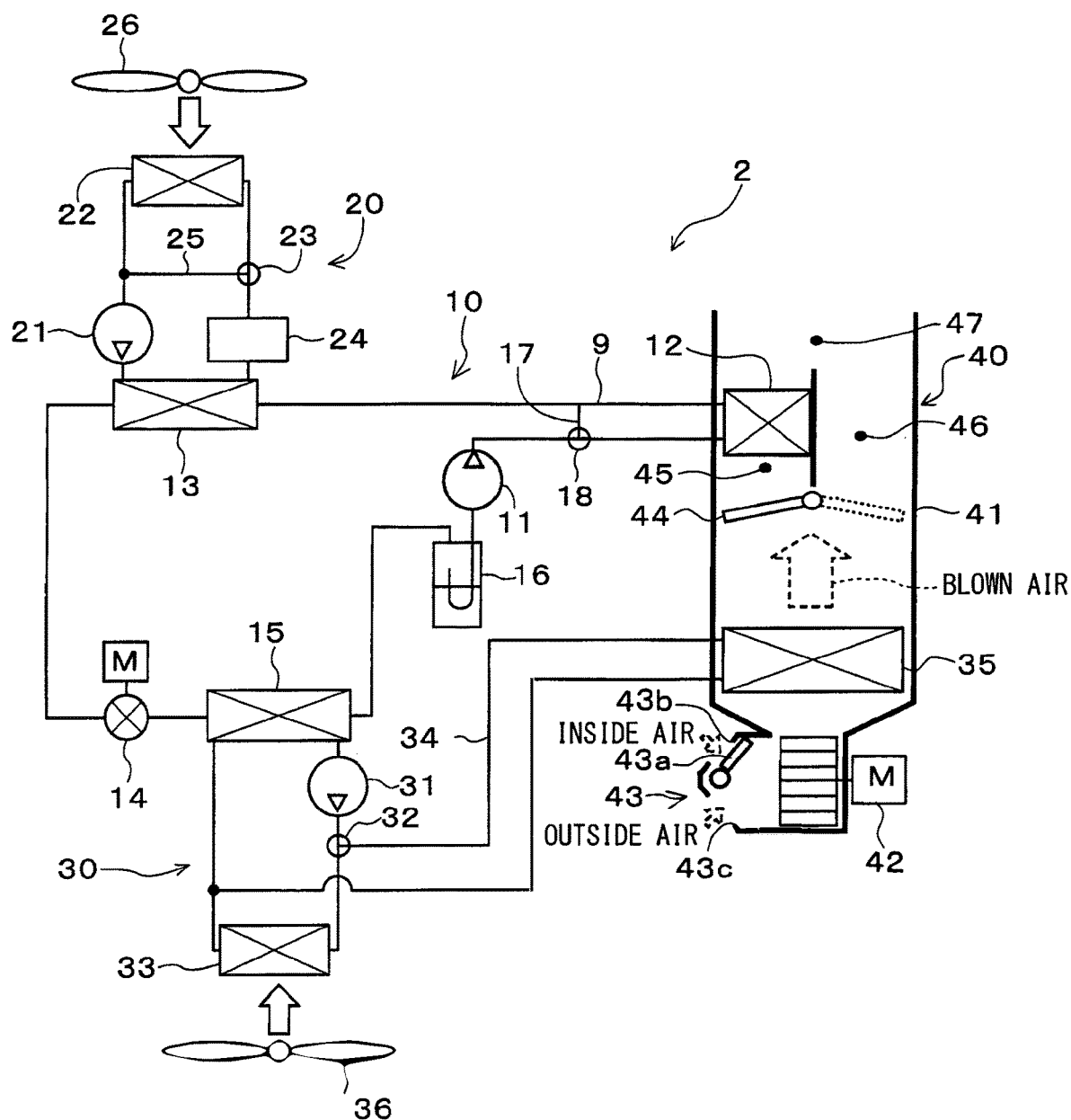
FIG. 4 is an overall configuration diagram of an air conditioner according to at least one of embodiments of the present disclosure.

An air conditioner 2 according to a second embodiment will be hereinafter described with reference to FIG. 4, particularly in points different from the air conditioner 1 of the first embodiment. The refrigeration cycle device 10 of the air conditioner 2 of the second embodiment further includes a refrigerant bypass flow passage 17 and a refrigerant three-way valve 18 in addition to the components of the air conditioner 1 of the first embodiment. Other configurations are similar to the corresponding configurations of the air conditioner 1 of the first embodiment.

The refrigerant bypass flow passage 17 is a flow passage where the high-pressure refrigerant discharged by the compressor 11 circulates toward the exterior condenser 13 while bypassing the interior condenser 12. The refrigerant bypass flow passage 17 is connected to the flow inlet side and the flow outlet side of the interior condenser 12 in the refrigerant passage 9.

The refrigerant three-way valve 18 is a flow rate control valve which controls the flow rate of the high-pressure refrigerant discharged from the compressor 11 and flowing into the interior condenser 12, and the flow rate of the high-pressure refrigerant discharged from the compressor 11 and flowing into the exterior condenser 13 by controlling the flow rate of the high-pressure refrigerant flowing into the refrigerant bypass flow passage 17.

Accordingly, the refrigerant three-way valve 18 can control the heat radiation amount from the high-pressure refrigerant to the blown air at the interior condenser 12 by controlling the flow rate of the high-pressure refrigerant flowing into the interior condenser 12. The refrigerant three-way valve 18 of the present embodiment therefore functions as a radiation amount control unit which controls the heat radiation amount from the high-pressure refrigerant to the blown air at the interior condenser 12.

An operation of the above configuration according to the present embodiment will be next described. In the cooling mode, the refrigerant three-way valve 18 operates such that the flow rate of the high-pressure refrigerant flowing into the interior condenser 12 becomes lower in the cooling mode than in the heating mode (including the extremely low temperature heating mode).

More specifically, according to the present embodiment, the refrigerant three-way valve 18 closes the refrigerant bypass flow passage 17 and opens the flow inlet side of the interior condenser 12 in the heating mode. In this manner, the total amount of the high-pressure refrigerant discharged by the compressor 11 flows into the interior condenser 12, and the blown air is heated through heat exchange between the high-pressure refrigerant and the blown air at the interior condenser 12.

According to the present embodiment, the refrigerant three-way valve 18 opens the refrigerant bypass flow passage 17 and closes the flow inlet side of the interior condenser 12 in the cooling mode. As a result, the total amount of the high-pressure refrigerant discharged by the compressor 11 flows into the refrigerant bypass flow passage 17, and into the exterior condenser 13. Accordingly, heat exchange between the high-pressure refrigerant and the blown air is avoidable at the interior condenser 12, wherefore heating of the blown air circulating in the inside of the casing 41 is securely prevented.

As described above, the refrigeration cycle device 10 of the present embodiment is also capable of switching between the heating mode and the cooling mode by controlling the flow rate of the high-pressure refrigerant flowing into the interior condenser 12 using the refrigerant three-way valve 18, and thereby controlling the heat radiation amount from the high-pressure refrigerant to the blown air at the interior condenser 12. Accordingly, advantageous effects similar to those of the first embodiment can be produced.

Third Embodiment

Figure 5:
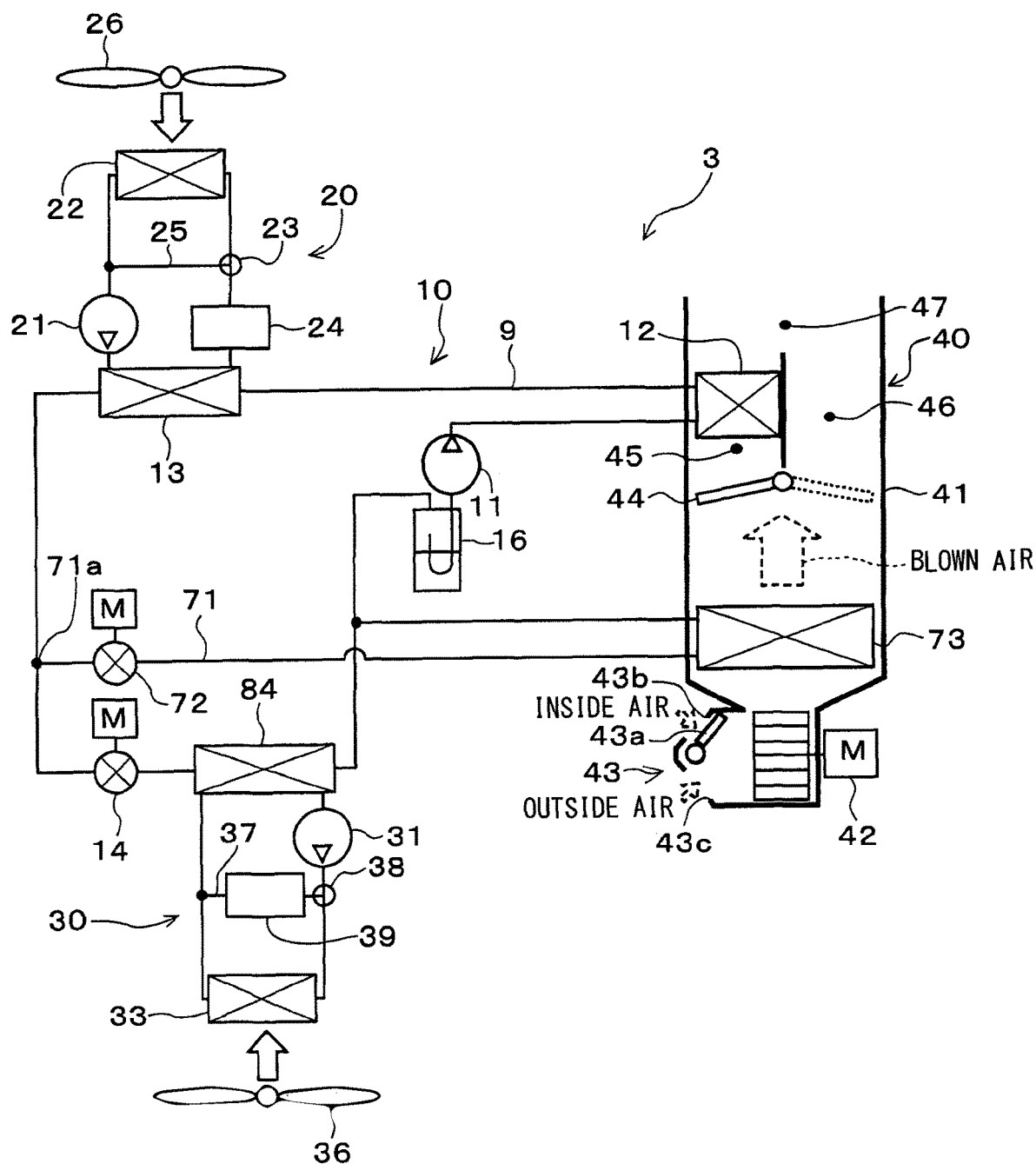
FIG. 5 is an overall configuration diagram of an air conditioner according to at least one of embodiments of the present disclosure.

An air conditioner 3 according to a third embodiment will be hereinafter described with reference to FIG. 5, particularly in points different from the air conditioner 1 of the first embodiment. The air conditioner 3 of the third embodiment includes a branching portion 71a, a cooling refrigerant passage 71, a cooling decompression valve 72, an interior evaporator 73, and the like in addition to the components of the air conditioner 1 of the first embodiment, and eliminates the cooler core passage three-way valve 32, the cooler core flow passage 34, the cooler core 35, and the like.

The branching portion 71a is a portion which branches a flow of the refrigerant having flowed from the exterior condenser 13. The branching portion 71a may be constituted by a three-way coupling structure. The inlet side of the decompression valve 14 is connected to one of flow outlets of the branching portion 71a. The inlet side of the cooling decompression valve 72 is connected to the other flow outlet of the branching portion 71a. Accordingly, the decompression valve 14 and the cooling decompression valve 72 are disposed in parallel with the refrigerant flow.

The cooling refrigerant passage 71 is a refrigerant passage which connects one of the flow outlets of the branching portion 71a and the suction side of the compressor 11 (specifically, inlet side of accumulator 16). The cooling decompression valve 72 and the interior evaporator 73 are disposed in the cooling refrigerant passage 71 in this order from the branching portion 71a side.

The cooling decompression valve 72 is a decompression unit which decompresses and expands the refrigerant branched at the branching portion 71a at least in the cooling mode. The cooling decompression valve 72 is an electric variable throttle mechanism which operates under control by a control signal output from the controller 50. The cooling decompression valve 72 has a valve body and an electric actuator. The valve body is configured to change a passage opening position (i.e., throttle opening position) of the refrigerant passage. The electric actuator has a stepping motor which changes the throttle opening position of the valve body.

The interior evaporator 73 is an evaporator which causes the low-pressure refrigerant decompressed by the cooling decompression valve 72 to directly absorb heat of the blown air to evaporate the low-pressure refrigerant at least in the cooling mode. The interior evaporator 73 is disposed on the air flow upstream side with respect to the interior condenser 12 and the air mix door 44 in the air passage formed in the casing 41.

A heating evaporator 84 is further disposed on the downstream side of the decompression valve 14. The heating evaporator 84 exchanges heat between the low-pressure refrigerant decompressed by the decompression valve 14 and the cooling water as a low-temperature side heat medium circulating in the low-temperature side heat medium flow passage 30. The basic configuration of the heating evaporator 84 is similar to the basic configuration of the evaporator 15 described in the first embodiment.

A low-temperature side bypass passage 37, a low-temperature side three-way valve 38, and a heat source device 39 are disposed in the low-temperature side heat medium flow passage 30 of the present embodiment. The low-temperature side bypass passage 37 is a passage where the cooling water discharged by the low-temperature side pump 31 circulates while bypassing the low-temperature side radiator 33. The low-temperature side bypass passage 37 connects the flow inlet side of the low-temperature side radiator 33 of the low-temperature side heat medium flow passage 30 and the flow outlet side of the low-temperature side radiator 33 of the low-temperature side heat medium flow passage 30.

The low-temperature side three-way valve 38 is a low-temperature side flow rate control valve which controls a flow rate of the cooling water flowing into the low-temperature side radiator 33 and a flow rate of the cooling water flowing into the heat source device 39 by controlling a flow rate of the cooling water flowing into the low-temperature side bypass passage 37. Operation of the low-temperature side three-way valve 38 is controlled in accordance with a control signal output from the controller 50.

Similarly to the heating device 24, the heat source device 39 may be constituted by an in-vehicle device which generates heat during operation, or a positive temperature coefficient (PTC) heater (electrical heater) which generates heat by receiving power, for example. Other configurations of the air conditioner 3 are similar to the corresponding configurations of the air conditioner 1 of the first embodiment.

An operation of the above configuration according to the present embodiment will be next described.

(Cooling Mode)

In the cooling mode of the present embodiment, the controller 50 closes the decompression valve 14, and brings the cooling decompression valve 72 into a throttling state for performing refrigerant decompression. A control signal, which indicates a degree of subcooling of the refrigerant flowing into the cooling decompression valve 72 and is output to the cooling decompression valve 72, is determined to indicate a degree of subcooling close to a target degree of subcooling determined beforehand such that a coefficient of performance (so-called COP) of the cycle becomes close to the maximum at the target degree. Operations of the other control target devices are similar to the corresponding operations in the cooling mode of the first embodiment.

Accordingly, in the cooling mode of the present embodiment, the refrigerant discharged from the compressor 11 radiates heat at the exterior condenser 13 similarly to the first embodiment. In the state that the decompression valve 14 is closed, the refrigerant having flowed from the exterior condenser 13 flows into the cooling decompression valve 72, and is decompressed to become a low-pressure refrigerant.

The low-pressure refrigerant decompressed by the decompression valve 14 flows into the interior evaporator 73. The low-pressure refrigerant having flowed into the interior evaporator 73 absorbs heat from the blown air supplied from the air-conditioning blower 42, and evaporates by the absorbed heat. As a result, the blown air is cooled. The refrigerant flowing from the interior evaporator 73 enters the accumulator 16, and is separated into gas and liquid. Then, the gas-phase refrigerant separated by the accumulator 16 is sucked into the compressor 11 and compressed again.

As described above, in the cooling mode, the blown air cooled at the interior evaporator 73 can be blown to the vehicle interior. Accordingly, cooling of the vehicle interior is achievable.

(Heating Mode and Extremely Low Temperature Heating Mode)

In the heating mode and the extremely low temperature heating mode of the present embodiment, the controller 50 closes the cooling decompression valve 72. The controller 50 further controls the operation of the low-temperature side three-way valve 38 such that the cooling water in the low-temperature side heat medium flow passage 30 flows into the heat source device 39. Operations of the other control target devices are similar to the corresponding operations in the heating mode and the extremely low temperature heating mode of the first embodiment.

Accordingly, in the heating mode of the present embodiment, the refrigerant discharged from the compressor 11 radiates heat at the interior condenser 12 and the exterior condenser 13, and is decompressed at the decompression valve 14 to become a low-pressure refrigerant similarly to the first embodiment.

The low-pressure refrigerant decompressed at the decompression valve 14 flows into the heating evaporator 84. In the heating mode, the low-temperature side pump 31 is operated. Accordingly, the low-pressure refrigerant having flowed into the heating evaporator 84 absorbs heat from the cooling water circulating in the low-temperature side heat medium flow passage 30, and evaporates by the absorbed heat. In this manner, the cooling water circulating in the low-temperature side heat medium flow passage 30 is cooled.

At this time, the low-temperature side three-way valve 38 is switched to introduce the cooling water toward the heat source device 39 in the heating mode. In this case, the cooling water cooled at the heating evaporator 84 absorbs heat from the heat source device 39. Accordingly, the low-pressure refrigerant having flowed into the heating evaporator 84 absorbs the heat which has been absorbed by the cooling water from the heat source device 39, and evaporates by the absorbed heat.

The refrigerant flowing from the heating evaporator 84 enters the accumulator 16, and is separated into gas and liquid. Other operations are similar to the corresponding operations of the first embodiment.

As described above, in the heating mode, the blown air heated at the interior condenser 12 can be blown to the vehicle interior similarly to the first embodiment. In this manner, heating of the vehicle interior is achievable. Furthermore, the refrigerant can be condensed by the exterior condenser 13, and the condensed refrigerant can be retained in the exterior condenser 13.

In the extremely low temperature heating mode, the blown air heated at the interior condenser 12 can be blown to the vehicle interior similarly to the first embodiment. In this manner, heating of the vehicle interior is achievable. Moreover, the temperature of the blown air can be efficiently raised by raising the refrigerant condensation temperature at the interior condenser 12 similarly to the first embodiment.

As described above, the refrigeration cycle device 10 of the present embodiment is also capable of switching between the heating mode and the cooling mode by controlling the heat radiation amount from the high-pressure refrigerant to the blown air at the interior condenser 12 by using the air mix door 44 as the heat radiation control unit similarly to the first embodiment. Accordingly, the cycle configuration of the refrigeration cycle device 10 can be simplified, and complicated control for switching the refrigerant circuit of the cycle device 10 is not needed.

The refrigeration cycle device 10 of the present embodiment includes the branching portion 71a, the heating evaporator 84, and the interior evaporator 73. In this case, direct heat exchange between the blown air and the low-pressure refrigerant can be achieved at the interior evaporator 73 in the cooling mode. Accordingly, the cooling ability of the blown air of the refrigeration cycle device 10 improves in comparison with a case of indirect heat exchange between the blown air and the low-pressure refrigerant via, for example, a heat medium.

In the heating mode, the refrigerant flows into the heating evaporator 84 without flowing into the interior evaporator 73. In this case, the refrigerant at the heating evaporator 84 can absorb heat from the cooling water to obtain a heat source of heating. Accordingly, the temperature of the blown air does not drop by unnecessary absorption of heat from the blown air.

The heat source device 39 for heating the cooling water as the low-temperature side heat medium is disposed in the low-temperature side heat medium flow passage 30 of the present embodiment. Accordingly, heating of the vehicle interior is achievable by utilizing heat generated by the heat source device 39.

The low-temperature side radiator 33 is disposed in the low-temperature side heat medium flow passage 30 of the present embodiment. Accordingly, the cooling water may be introduced toward both the heat source device 39 and the low-temperature side radiator 33, unlike the above-described example which controls the operation of the low-temperature side three-way valve 38 such that the cooling water of the low-temperature side heat medium flow passage 30 flows toward the heat source device 39 in the heating mode and the extremely low temperature heating mode of the present embodiment.

In this case, heat for heating the vehicle interior can be absorbed from both the heat source device 39 and the outside air. Accordingly, an excessive temperature drop of the heat source device 39 can be reduced.

The refrigeration cycle device 10 according to the present embodiment includes the interior evaporator 73 and the heating evaporator 84 independent of each other as heat exchangers for evaporating the low-pressure refrigerant. Accordingly, an evaporator of an appropriate size or a heat exchange type suitable for specific applications can be adopted for each of the heating evaporator 84 and the interior evaporator 73.

For example, the interior evaporator 73 may be constituted by a so-called tank-and-tube type heat exchanger structure which includes a plurality of tubes where a refrigerant circulates, and a pair of tanks for distributing or collecting the refrigerant to and from the tubes. Moreover, the heating evaporator 84 may be constituted by a so-called stacked heat exchanger structure which includes stacked plate-shaped members.

Fourth Embodiment

Figure 6:
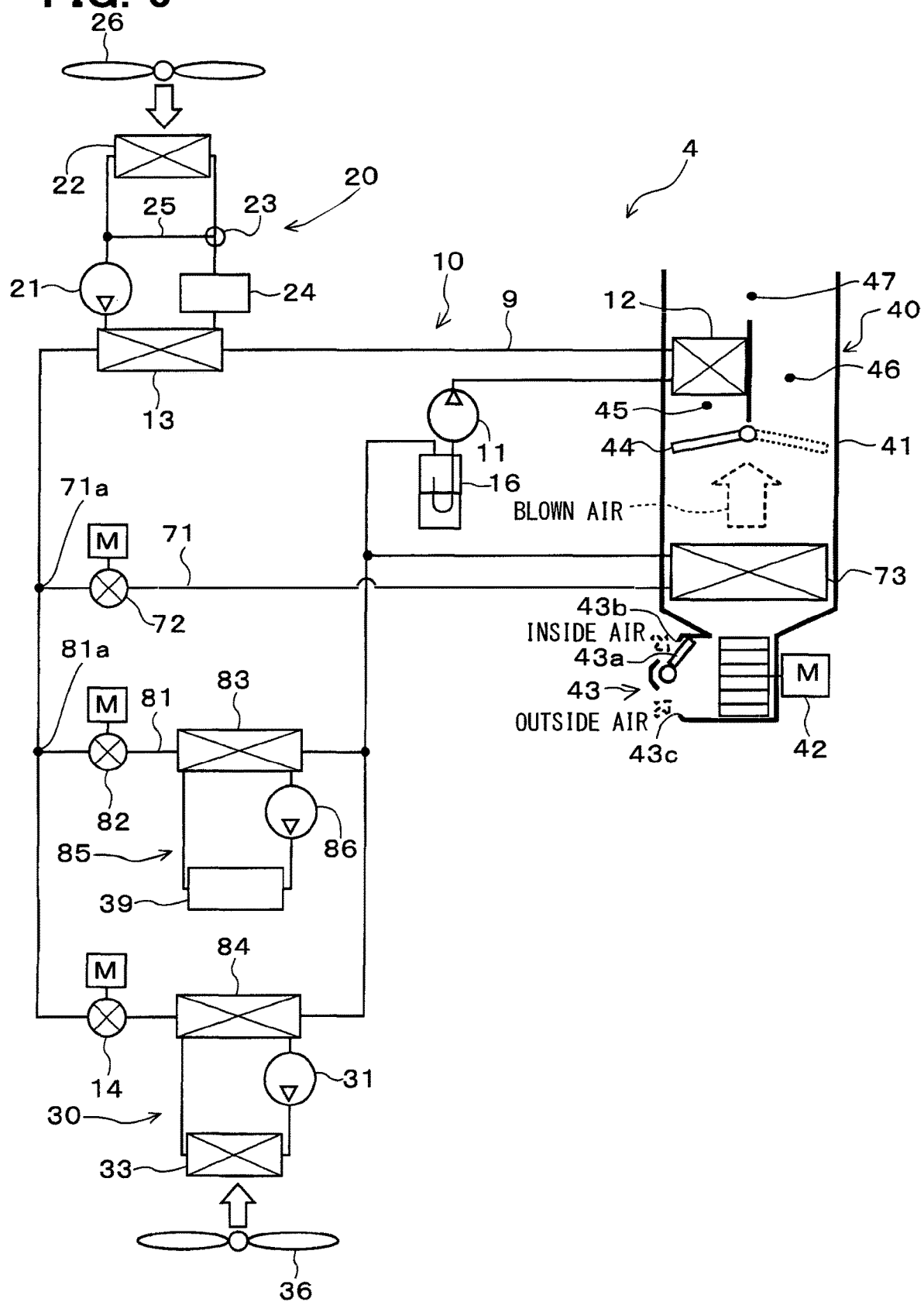
FIG. 6 is an overall configuration diagram of an air conditioner according to at least one of embodiments of the present disclosure.

An air conditioner 4 according to a fourth embodiment will be hereinafter described with reference to FIG. 6, particularly in points different from the air conditioner 3 of the third embodiment. The air conditioner 4 of the fourth embodiment is different from the air conditioner 3 of the third embodiment in that an evaporator flow passage 81, an evaporator decompression valve 82, a heat source device cooling evaporator 83, a heat source device cooling passage 85, and a heat source device cooling pump 86 are added, and that the low-temperature side bypass passage 37 and the low-temperature side three-way valve 38 are eliminated. Other configurations are similar to the corresponding configurations of the air conditioner 3 of the third embodiment.

The evaporator flow passage 81 connects the refrigerant passage 9 between the exterior condenser 13 and the decompression valve 14, and the refrigerant passage 9 between the evaporator 15 and the accumulator 16 (compressor 11). The evaporator decompression valve 82 and the heat source device cooling evaporator 83 are disposed in this order in the evaporator flow passage 81 from the side of the branching portion 81a branched from the refrigerant passage 9 between the exterior condenser 13 and the decompression valve 14.

The evaporator decompression valve 82 is provided in parallel with the decompression valve 14 and the cooling decompression valve 72. The evaporator decompression valve 82 is a decompression unit which decompresses and expands a liquid-phase refrigerant flowing from the exterior condenser 13 and branched at the branching portion 81a.

The evaporator decompression valve 82 is an electric variable throttle mechanism which operates under control by a control signal output from the controller 50, and includes a valve body and an electric actuator. The valve body is configured to change a passage opening position (i.e., throttle opening position) of the refrigerant passage. The electric actuator has a stepping motor which changes the throttle opening position of the valve body.

The heat source device cooling evaporator 83 is provided in parallel with the evaporator 15 and the interior evaporator 73. The heat source device cooling evaporator 83 exchanges heat between the low-pressure refrigerant decompressed at the evaporator decompression valve 82 and the cooling water as a low-temperature side heat medium circulating in the heat source device cooling passage 85 to cause the low-pressure refrigerant to absorb heat from the cooling water, thereby evaporating the low-pressure refrigerant by the heat.

The heat source device cooling passage 85 is an annular flow passage where the cooling water as the low-temperature side heat medium circulates. The heat source device cooling evaporator 83, the heat source device cooling pump 86, and the heat source device 39 are disposed in this order in the heat source device cooling passage 85.

The heat source device cooling pump 86 is a heat medium pump which sucks and discharges cooling water. The heat source device cooling pump 86 is an electric pump, and corresponds to a cooling water flow rate control unit which controls a flow rate of the cooling water circulating in the heat source device cooling passage 85.

When the heat source device 39 is cooled, the evaporator decompression valve 82 is brought into the throttling state. As a result, the low-pressure refrigerant decompressed by the evaporator decompression valve 82 flows into the heat source device cooling evaporator 83. Thereafter, at the heat source device cooling evaporator 83, the low-pressure refrigerant exchanges heat with the cooling water and is heated through the heat exchange, while the cooling water exchanges heat with the low-pressure refrigerant and is cooled by the heat exchange. Moreover, the heat source device 39 is cooled by the cooling water discharged by the heat source device cooling pump 86.

According to the air conditioner 4 of the fourth embodiment, the evaporator for evaporating the low-pressure refrigerant includes the interior evaporator 73 which causes the low-pressure refrigerant decompressed at the cooling decompression valve 72 to absorb heat from the blown air in the cooling mode, the heat source device cooling evaporator 83 which causes the low-pressure refrigerant decompressed at the evaporator decompression valve 82 to absorb heat generated by the heat source device 39, and the heating evaporator 84 which causes the low-pressure refrigerant decompressed at the decompression valve 14 to absorb heat from the outside air in the heating mode.

The present disclosure is not limited to the above-described embodiments. Various modifications, such as modifications described below, may be made without departing from the scope and spirit of the present disclosure. The respective embodiments described above may be appropriately combined within a feasible range.

In the embodiments described above, the refrigeration cycle device 10 according to the present disclosure has been applied to the vehicle air conditioner. However, application examples of the refrigeration cycle device 10 according to the present disclosure are not limited to vehicles, but may be stationary air conditioners. Furthermore, application examples of the refrigeration cycle device 10 according to the present disclosure are not limited to air conditioners, but may include a water heater which designates drinking water or water for domestic use as the heat exchange target fluid.

According to the embodiments described above, the accumulator 16 as the liquid storage unit for storing a refrigerant is disposed on the upstream side of the compressor 11. However, the liquid storage unit is not limited to the accumulator 16 thus configured. For example, a receiver (liquid receiver) which stores a surplus liquid-phase refrigerant included in the refrigerant having flowed from the exterior condenser and separated into gas and liquid may be disposed on the downstream side of the exterior condenser 13 as the liquid storage unit. Needless to say, the accumulator 16 and the receiver may be simultaneously disposed.

According to the embodiments, the refrigeration cycle device 10 capable of switching between the cooling mode and the heating mode (including extremely low temperature heating mode) has been described. However, switching of the operation mode of refrigeration cycle device 10 is not limited to this manner of switching.

For example, in the refrigeration cycle device 10 described in the first embodiment, the blown air is cooled at the cooler core 35 similarly to the cooling mode. In this case, the blown air cooled and dehumidified at the cooler core 35 may be reheated at the interior condenser 12 and blown to the air conditioning target space by changing the opening position of the air mix door 44. This configuration can switch the operation mode to a dehumidification heating mode which achieves dehumidification heating of the air conditioning target space.

Moreover, for example, in the refrigeration cycle device 10 described in the third embodiment, heat of the heat source device 39 is absorbed similarly to the heating mode. In this case, the air mix door 44 is shifted to close the interior condenser passage 45, and the high-temperature side pump 21 is operated to introduce the cooling water of the high-temperature side heat medium flow passage 20 into the high-temperature side radiator 22. This configuration can switch the operation mode to a device cooling mode which radiates heat generated by the heat source device 39 to the outside air at the high-temperature side radiator 22 without controlling the temperature of the blown air.

In the embodiments described above, the high-temperature side radiator 22 and the low-temperature side radiator 33 may be configured such that the cooling water circulating in the high-temperature side radiator 22 and the cooling water circulating in the low-temperature side radiator 33 (i.e., high-temperature side heat medium and low-temperature side heat medium) can transfer heat to each other. For example, for achieving heat transfer, each of the high-temperature side radiator 22 and the low-temperature side radiator 33 may be constituted by a tank-and-tube type heat exchanger, and fins of both the heat exchangers for promoting heat exchange may be constituted by common metal members. Moreover, the high-temperature side heat medium and the low-temperature side heat medium may be configured to join each other.

While details of the respective heat exchangers are not described in the embodiments described above, the heat source device cooling evaporator 83 and the heating evaporator 84 described in the fourth embodiment are constituted by the same type of evaporator in the point that heat exchange is achieved between the refrigerant and the heat medium (liquid without phase change), for example. Accordingly, the heat source device cooling evaporator 83 and the heating evaporator 84 may have a common structure (e.g., stacked heat exchanger structure) to combine these evaporators into one body.

The respective components constituting the refrigeration cycle device 10 are not limited to those disclosed in the embodiments described above. For example, while the compressor 11 is constituted by an electric compressor in the embodiments described above, the compressor 11 may be constituted by an engine driving type compressor driven by rotational driving force transmitted from a vehicle traveling engine via a pulley, a belt, or the like in an example applied to a vehicle traveling engine.

It should be understood that the present disclosure described based on the embodiments is not limited to the embodiments or structures presented herein. The present disclosure also includes various modifications and variations within an equivalent range. In addition, not only various combinations and modes presented in the present disclosure, but also other combinations and modes including only a single element, or more or less elements of the present disclosure, are all included in the scope and the range of spirit of the present disclosure.

What is claimed is:

1. A refrigeration cycle device comprising:
    a compressor configured to compress a refrigerant and discharge the refrigerant;
    a heating radiator configured to allow a high-pressure refrigerant discharged by the compressor to release heat to a heat exchange target fluid;
    a heat medium radiator configured to allow the high-pressure refrigerant discharged by the compressor to release heat to a high-temperature side heat medium;
    a decompressor configured to decompress the refrigerant on a downstream side of each of the heating radiator and the heat medium radiator;
    an evaporator configured to allow the refrigerant decompressed by the decompressor to absorb heat of the heat exchange target fluid such that the refrigerant evaporates;
    a radiation amount adjuster configured to adjust a heat radiation amount radiated from the high-pressure refrigerant to the heat exchange target fluid at the heating radiator;
    a heater device configured to heat the high-pressure refrigerant flowing out of the heating radiator;
    a high-temperature side heat medium passage in which the high-temperature side heat medium circulates;
    an outside air temperature sensor configured to detect an outside air temperature; and
    a controller coupled with the outside air temperature sensor, wherein
    the heater device is disposed in the high-temperature side heat medium passage and is configured to heat the high-temperature side heat medium,
    the high-temperature side heat medium passage has
        a high-temperature side radiator configured to cause the high-temperature said heat medium to release heat through heat exchange with an outside air,
        a high-temperature side bypass passage through which the high-temperature side heat medium flowing out of the heater bypasses the high-temperature side radiator, and
        a high-temperature side valve controlled by the controller to switch a flow of the high-temperature side heat medium in the high-temperature side heat medium passage,
    the controller is configured to control the high-temperature side valve such that the high-temperature side heat medium flows through the high-temperature side bypass passage to bypass the high-temperature side radiator when the outside air temperature is at or below a predetermined reference temperature,
    in a heating mode for heating the heat exchange target fluid, the radiation amount adjuster is configured to adjust the heat radiation amount at the heating radiator to be larger than a heat radiation amount at the heat medium radiator, and
    in a cooling mode for cooling the heat exchange target fluid, the radiation amount adjuster is configured to adjust the heat radiation amount at the heating radiator to be lower than that in the heating mode.

2. The refrigeration cycle device according to claim 1, wherein
    the heat medium radiator is configured to allow the refrigerant flowing out of the heating radiator to release heat to the high-temperature side heat medium, and
    the radiation amount adjuster is configured to adjust a vapor quality of the refrigerant on an inlet side of the heat medium radiator in the heating mode to be lower than that in the cooling mode.

3. The refrigeration cycle device according to claim 2, further comprising:
    a liquid reservoir configured to store the refrigerant, wherein
    the liquid reservoir is located on at least one of a downstream side of the heat medium radiator or an upstream side of the compressor.

4. The refrigeration cycle device according to claim 1, wherein
    the radiation amount adjuster is configured to adjust a flow rate of the heat exchange target fluid passing through the heating radiator, and
    the radiation amount adjuster is configured to adjust the flow rate of the heat exchange target fluid passing through the heating radiator in the cooling mode to be smaller than that in the heating mode.

5. The refrigeration cycle device according to claim 1, wherein
    the radiation amount adjuster is configured to adjust
        a flow rate of the high-pressure refrigerant discharged by the compressor and flowing into the heating radiator and
        a flow rate of the high-pressure refrigerant discharged by the compressor and flowing into the heat medium radiator, and
    the radiation amount adjuster is configured to adjust the flow rate of the high-pressure refrigerant flowing into the heating radiator in the cooling mode to be smaller than that in the heating mode.

6. The refrigeration cycle device according to claim 1, further comprising:
    a branch portion configured to divide a flow of the refrigerant flowing out of the heat medium radiator into one flow and another flow; and
    a heating evaporator configured to exchange heat between the refrigerant of the one flow and a low-temperature side heat medium, wherein
    the evaporator is configured to exchange heat between the refrigerant of the other flow and the heat exchange target fluid.

7. The refrigeration cycle device according to claim 6, further comprising:
    a low-temperature side heat medium passage in which the low-temperature side heat medium circulates; and
    a heat source device disposed in the low-temperature side heat medium passage and configured to heat the low-temperature side heat medium.

8. The refrigeration cycle device according to claim 6, further comprising:
- a low-temperature side heat medium passage in which the low-temperature side heat medium circulates; and
- a low-temperature side radiator disposed in the low-temperature side heat medium passage and configured to exchange heat between the low-temperature side heat medium and an outside air.

* * * * *